United States Patent [19]
Zosimadis

[11] Patent Number: 6,059,192
[45] Date of Patent: May 9, 2000

[54] WIRELESS TEMPERATURE MONITORING SYSTEM

[76] Inventor: Peter Zosimadis, 151 Carlingview Drive, Unit 3, Toronto, Ontario, Canada, M9W 5S4

[21] Appl. No.: 08/998,576

[22] Filed: Dec. 29, 1997

Related U.S. Application Data

[63] Continuation-in-part of application No. 08/628,320, Apr. 4, 1996, Pat. No. 5,845,844.

[51] Int. Cl.[7] .................................................. G05D 23/13
[52] U.S. Cl. ........................ 236/12.12; 4/623; 251/129.04
[58] Field of Search ......................... 236/12.12; 137/606, 137/607; 251/129.04; 4/623

[56] References Cited

U.S. PATENT DOCUMENTS

| | | |
|---|---|---|
| 4,700,884 | 10/1987 | Barrett et al. . |
| 4,735,357 | 4/1988 | Gregory et al. . |
| 4,762,429 | 8/1988 | Fujikawa . |
| 4,941,608 | 7/1990 | Shimizu et al. . |
| 5,050,062 | 9/1991 | Hass . |
| 5,199,790 | 4/1993 | Pawelzik et al. . |
| 5,217,035 | 6/1993 | Van Marcke ................................ 137/1 |
| 5,226,629 | 7/1993 | Millman et al. . |
| 5,358,177 | 10/1994 | Cashmore . |
| 5,400,961 | 3/1995 | Tsutsui et al. . |
| 5,449,112 | 9/1995 | Heitman et al. . |
| 5,476,221 | 12/1995 | Seymour . |
| 5,577,660 | 11/1996 | Hansen . |
| 5,595,342 | 1/1997 | McNair et al. . |
| 5,655,749 | 8/1997 | Mauerhofer ......................... 251/129.04 |
| 5,855,356 | 1/1999 | Fait .................................... 251/129.04 |
| 5,868,311 | 2/1999 | Cretu-Petra ......................... 251/129.04 |

FOREIGN PATENT DOCUMENTS

| | | |
|---|---|---|
| 2090131 | 8/1993 | Canada . |
| 2128725 | 6/1994 | Canada . |
| 0 175 552 | 3/1986 | European Pat. Off. . |
| 0 446 953 | 9/1991 | European Pat. Off. . |
| 2 550 648 | 2/1985 | France . |
| WO 87/05352 | 9/1987 | WIPO . |
| WO 94/00645 | 1/1994 | WIPO . |
| WO 94/05131 | 3/1994 | WIPO . |
| WO 97/18359 | 5/1997 | WIPO . |

*Primary Examiner*—William E. Tapolcai
*Attorney, Agent, or Firm*—Andrew Hicks; Borden Elliot Scott & Aylen

[57] ABSTRACT

The present invention relates to a wireless temperature monitoring system useful in reducing the risk of scalding to the users of a faucet. The system includes a temperature sensor/transmitter attached to the end of a faucet which communicates via a wireless link to a controller. The wireless link is particularly advantageous in the installation of the system on a faucet. One embodiment of the system includes a user detector for touchless control of the flow of water from a faucet. The invention may also provide a digital display with audio and/or visual alarms to indicate if a pre-set maximum temperature has been exceeded and a shut-off valve to interrupt flow of water to the faucet.

17 Claims, 5 Drawing Sheets

WIRELESS TEMPERATURE MONITORING SYSTEM

RELATED APPLICATIONS

This application is a continuation-in-part of U.S. patent application 08/628,320 filed Apr. 4, 1996 now U.S. Pat. No. 5,845,844.

FIELD OF THE INVENTION

The present invention relates to a wireless temperature monitoring system useful in reducing the risk of scalding to the user of a faucet. The system includes a temperature sensor/transmitter attached to the end of a faucet which communicates via a wireless link to a controller. The wireless link is utilized to facilitate installation on a faucet. One embodiment of the system includes a user detector for touchless control of the flow of water to a faucet. The invention may also provide a digital display with audio and/or visual alarms to indicate if a pre-set maximum temperature has been exceeded and a shut-off valve to interrupt flow of water to the faucet.

BACKGROUND OF THE INVENTION

The risk of scalding through the use of hot water faucets by certain groups of people, particularly disabled, elderly or young children, is present in many homes or institutions. Often, these people mistake the hot and cold water taps on a faucet or have difficulty operating a faucet which leads to exposure to dangerously hot water from the faucet. Typically, water temperatures in excess of 42° C. can cause injury to unprotected skin. While in various hot water heaters it is possible to set the thermostat to a lower temperature, many hot water tanks have their thermostats set in excess of 60° C. in order to ensure adequate hot water supply to the system for tasks such as laundry or running a dishwasher where a higher water temperature is desired.

Accordingly, there has been a need for products which effectively control the flow of hot water from a faucet to ensure that potentially scalding temperatures are not exceeded by individual faucets in a hot water system.

Past temperature monitoring and shut-off systems exist for controlling the flow of water or a fluid through conduits. Systems also exist with respect to faucets which regulate and control the flow of water to a faucet. These systems often include mechanisms for electronically monitoring the water temperature and adjusting the flow of hot and cold water to control a selected temperature. One disadvantage of these systems is that they are often highly complex requiring complete replacement of an entire faucet to enable their installation. The complexity often leads to an increased cost to the consumer.

Furthermore, these past systems may detract from the aesthetic look of a particular faucet by requiring unsightly attachments to the faucet or, alternatively, requiring the complete replacement of a faucet with a design which does not complement the overall style or look to a bathroom or kitchen. For example, in those systems which do not require replacement of the existing faucet, the installation often detracts from the aesthetic appearance of the faucet either through visible wires, valves and/or complex control panels.

Accordingly, there has been a need for an anti-scald device which may be installed on existing faucets without detracting from the aesthetic look of the faucet, specifically without the use of unsightly wires or valve mechanisms. Furthermore, there has been a need for an anti-scald device which can be readily installed by either a plumber or a lay person with minimal plumbing experience.

Specifically, there has been a need for a device which monitors the temperature of water flowing from a faucet and communicates the temperature information to a controller for processing through a wireless communication link. Information received from the controller may be used for providing a digital display of temperature and/or for controlling a shut-off valve in the event that the water temperature exceeds a pre-set value.

Still further, with respect to the wireless transmission of temperature data, there has been a need to improve the efficiency of power consumption relating to the transmission of temperature and, specifically, a need for a system which transmits temperature data only if a user is present.

Furthermore, while systems exist which allow for touchless control of a faucet, few systems allow a user to control of the temperature the water. In addition, some of these systems pressurize a faucet at the aerator causing stress in the spout and faucet outside of its engineered specifications which may lead to premature failure of the faucet.

Accordingly, there has been a need for an anti-scald device having increased power consumption efficiency through the provision of a user detector enabling non-continuous temperature data transmission. Additionally, there has been a need for an anti-scald device that has the feature of touchless flow control which also eliminates pressurizing the spout and faucet.

A review of the prior art indicates that systems exist which provide water temperature monitoring, control and shut-off in the event of excess temperatures. These include devices disclosed in U.S. Pat. Nos. 4,256,258, 5,184,642, 4,756,030, 4,886,207 and 5,226,629. However, none of these patents disclose a device which addresses and solves the above problems, specifically providing a device which can be readily retrofitted to existing faucets without significantly detracting from the aesthetic look of the faucet.

SUMMARY OF THE INVENTION

In view of the above needs, the invention seeks to provide an anti-scald device which may be readily configured to existing faucets and which does not significantly detract from the aesthetic look of the faucet.

Accordingly, the invention provides a temperature sensing device and transmitter, preferably for attachment to the end of a faucet with a screw ring having a standard thread. Temperature information from the faucet is transmitted to a controller where it may be used to actuate a hot-water shut-off valve and optionally provide a digital display of actual temperature or both. In the case of a hot-water shut-off valve, it is preferable that the shut-off valve is battery operated.

The system may also be provided with a user detector for automatic activation of the faucet thereby improving operational efficiency. The user detector is able to serve as an on/off switch for the system enabling the system to automatically turn on when a user is present and/or off when a user is no longer present.

Thus, in accordance with the invention, a faucet control system to monitor the temperature of a fluid flowing from a faucet is provided, the faucet control system comprising:

a temperature sensor and transmitter for attachment to the faucet, the temperature sensor and transmitter for obtaining temperature data relating to the temperature of a fluid flowing from the faucet and for wireless transmission of the temperature data;

a user detector operatively connected to the temperature sensor and transmitter, said user detector including means for activating the temperature sensor and transmitter in the presence of a user; and a controller for receiving and processing the temperature data wherein the controller includes means for initiating fluid flow from the faucet and/or means for interrupting fluid flow from the faucet if the temperature of the fluid flowing from the faucet exceeds a pre-set value or the user detector no longer detects the presence of a user.

In a further embodiment, the invention also provides a faucet control system which controls the flow of a fluid through a faucet comprising:

a user detector for detecting the presence of a user at the faucet and generating an ON signal in the presence of a user and an OFF signal in the absence of a user;

a transmitter operatively connected to the user detector for attachment to the faucet, the transmitter for wireless transmission of the ON signal and OFF signal;

a controller for receiving and processing the ON signal and OFF signal wherein the controller includes means for initiating fluid flow from the faucet upon receipt of the ON signal and means for interrupting fluid flow from the faucet upon receipt of the OFF signal.

BRIEF DESCRIPTION OF THE DRAWINGS

These and other features of the invention will be more apparent from the following description in which reference is made to the appended drawings of the valve unit in accordance with the invention.

DETAILED DESCRIPTION OF THE INVENTION

Figure 2:
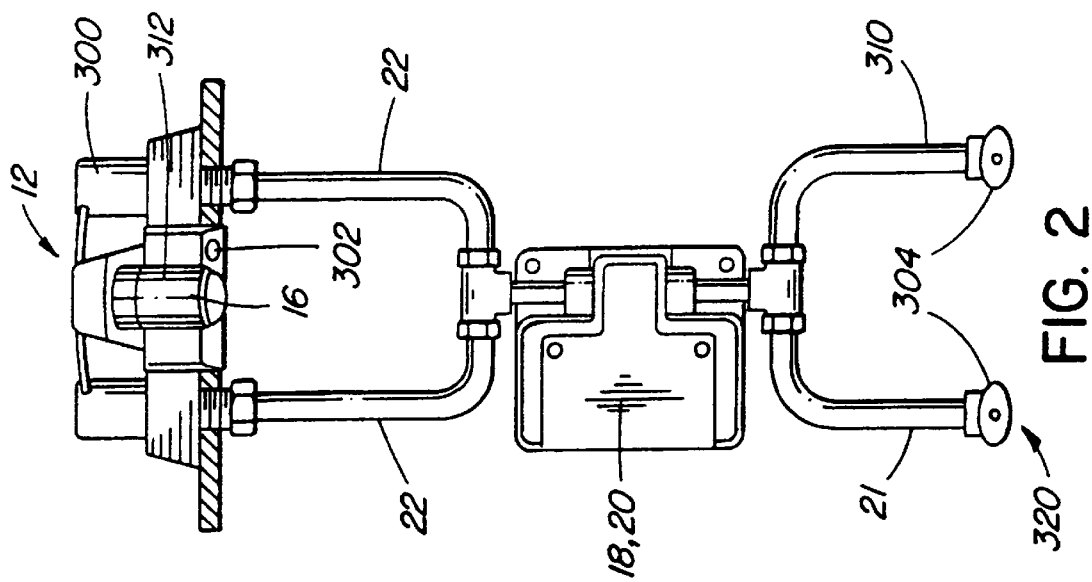
FIG. 2 is a front sectional view of one embodiment of the invention showing an existing faucet retrofitted to function as a touchless, constant water temperature faucet.
Figure 1:
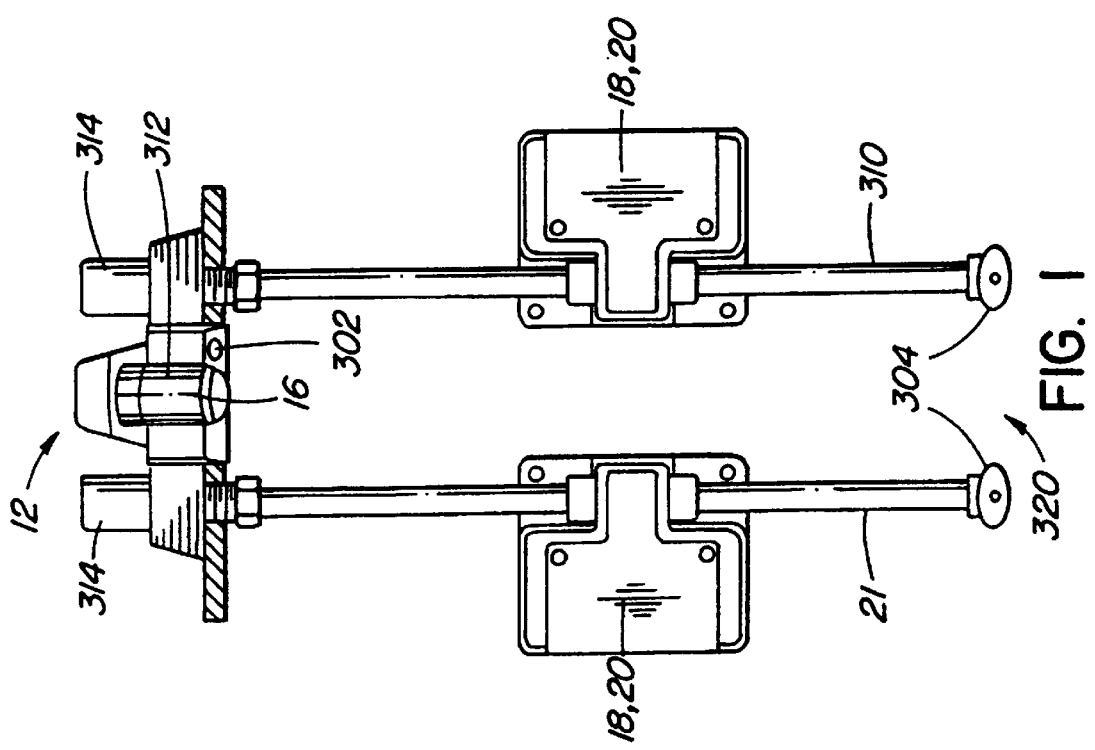
FIG. 1 is a front sectional view of one embodiment of the invention showing a user sensor with a combined controller and shut-off valve.
Figure 3:
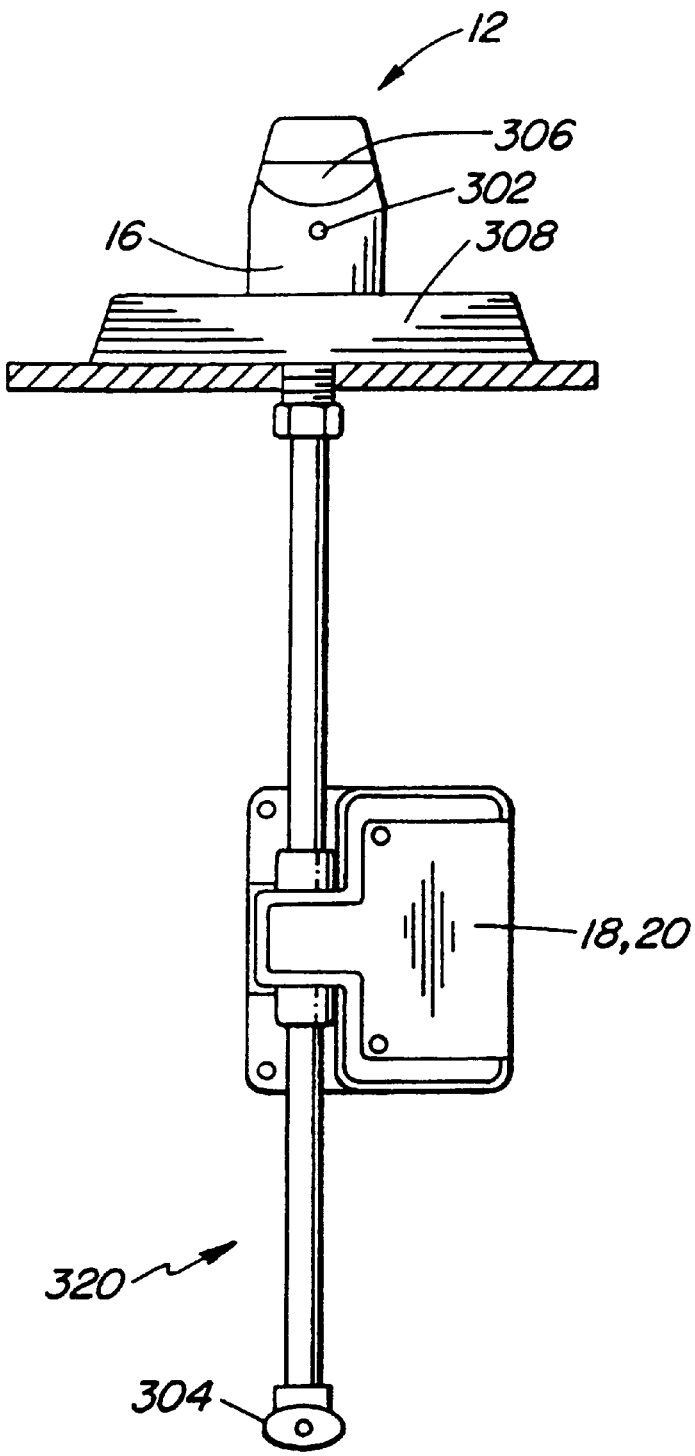
FIG. 3 is a front sectional view of one embodiment of the invention showing a faucet containing an integrated user sensor.

Three embodiments of a touchless, wireless, temperature monitoring device 320 are shown in FIGS. 1, 2 and 3.

With reference to FIGS. 1, 2, and 3, an anti-scald device 320 is shown in combination with a user detector 302. In each of these figures, the temperature monitoring device 320 includes a temperature sensor/transmitter 16, an integrated controller 18/shut-off valve 20, and a user detector 302.

Detection of a user by the user detector 302 activates the temperature sensor/transmitter 16 to generate temperature data. The temperature data is transmitted to the controller 18 where the temperature data is received and processed. The controller 18 activates the shut-off valve 20 initiate the flow of water and/or stop water flow should the temperature exceed a pre-set maximum temperature or the user moves away from the faucet. The temperature sensor/transmitter 16, the controller 18 and the valve 20 are preferably battery operated.

FIG. 1 illustrates an embodiment in which an existing faucet 12 is retrofitted with a wireless temperature monitoring system resulting in a touchless faucet which provides the user with direct temperature control of water flowing from the faucet. In this embodiment, the user detector 302 is integrated with the temperature sensor/transmitter 16 to form an aerator module 312. An integrated controller 18/shut-off valve 20 is configured to each of the hot water 21 and cold water 310 pipes. In this embodiment, both the hot and cold water controller 18/shut-off valve units 18,20 will simultaneously receive temperature data from the aerator module 312. The simultaneous receipt of temperature data allows the valves 20 on both the hot water 21 and cold water 310 pipes to open concurrently to initiate water flow and/or close concurrently thereby stopping all water flow to the faucet 12 in the event that the pre-set maximum temperature is exceeded or the user moves away from the faucet.

In operation, a user approaches the faucet 12 and operates the knobs 314 in the normal manner for starting and stopping water flow from the faucet. The user detector 302, detecting the presence of a user, causes temperature data to be transmitted from the temperature sensor/transmitter 16 whereby it is simultaneously received by the controllers 18 on the hot and cold water supply lines 21,310. The receipt of temperature data causes the shut-off valves 20 to simultaneously open allowing water to flow from the faucet. In the event that the water temperature flowing from the faucet exceeds a pre-set maximum, the controllers 18 cause valves 20 to close. Alternatively, if the user moves away from the faucet, temperature data will cease being transmitted and the valves 20 will simultaneously close.

The location of the integrated controller 18/shut-off valve 20 beneath the faucet 12 ensures high pressure water is upstream of the faucet 12.

FIG. 2 shows an embodiment in which an existing faucet 12 is retrofitted on an existing faucet to function as a touchless, constant water temperature faucet. In this embodiment, the existing faucet control knobs are opened to allow water to flow through the faucet 20. Decorative caps 300 may be provided to cover the existing faucet knobs in order to prevent a user from attempting to operate the existing faucet knobs. Hot water 21 and cold water 310 pipes are joined upstream of the integrated controller 18/shut-off valve 20 in order to provide hot and cold water mixing at the shut-off valve 20. Downstream of shut-off valve 20, pipes 22 are separated for connection to the existing faucet 12. The temperature of the water to the faucet 12 is fixed by the position of the compression stops 304 on each of the hot water 21 and cold water 310 pipes. The controller is linked via a wireless link to an aerator module 312 as described above.

In this embodiment, a user merely approaches the faucet and places their hands beneath the aerator module 312. The user detector 302, upon sensing the user initiates the transmission of temperature data from the aerator module 312. The integrated controller 18/shut-off valve 20, upon receiving temperature data, opens the shut-off valve to allow mixed hot and cold water to flow through the faucet. In the event that the temperature of the water flowing from the faucet exceeds a preset value, the shut-off valve will close thus stopping water flow from the faucet 12. Similarly, if a user removes their hands from the faucet, the transmission of temperature data ceases and the controller 18 causes the shut-off valve 20 to close, thus stopping the flow of water from the faucet.

FIG. 3 shows an embodiment of the invention incorporating touchless and anti-scald properties into a faucet having a tepid water supply. In this embodiment, the temperature sensor/transmitter 16 is preferably packaged in the base of the faucet 12 and communicates through a wireless link with the integrated controller 18/shut-off valve 20. This embodiment would be typically used in an institutional installation where a warm water supply would be available. Accordingly, in this embodiment, a warm or tepid water supply requires only a single pipe and hence, only a single controller 18/shut-off valve 20 to provide full anti-scald protection in the event of a change in water supply temperature.

Figure 4A:
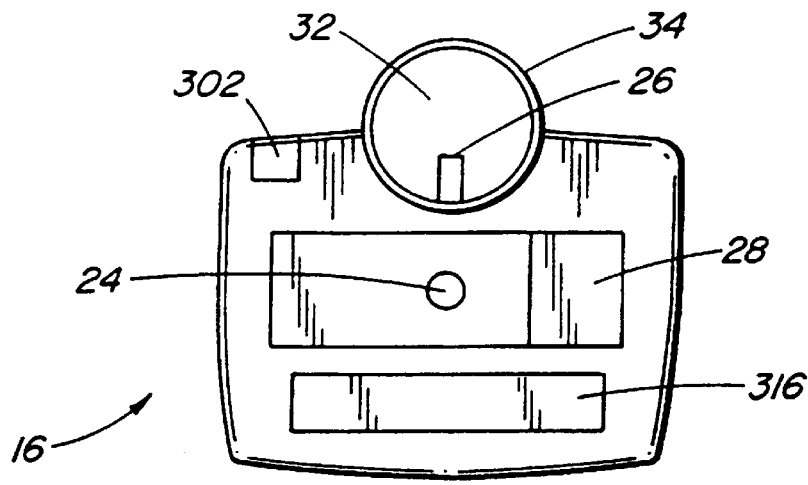
FIG. 4a is a top sectional view of a temperature sensor/transmitter according to one embodiment of the invention.
Figure 4B:
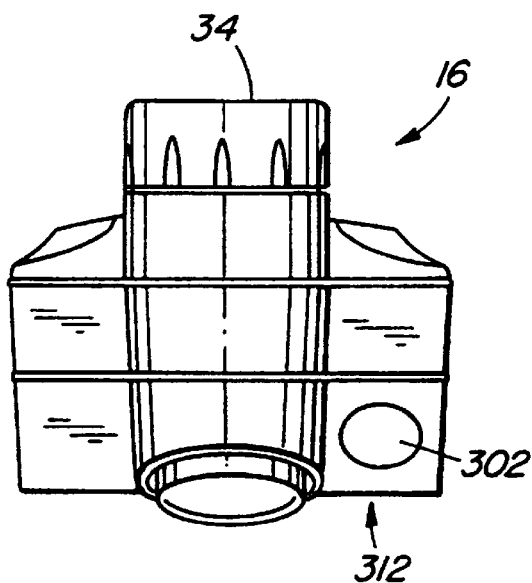
FIG. 4b is a side view of a typical aerator module.
Figure 4C:
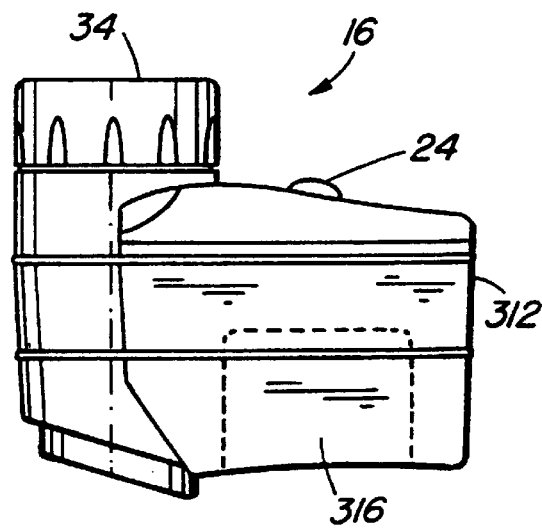
FIG. 4c is a top view of a typical aerator module.

FIGS. 4a, 4b, 4c show an aerator module 312 containing a temperature sensor/transmitter 16, a temperature sensor 26, a controller/transmitter 28, a user detector 302, a battery 316 and an optional bypass button 24. The user detector 302 can be any touchless detection switch known in the art that is suitable for a faucet application. For example, the user detector 302 could be an infrared switch. The user detector 302 acts to detect the presence of a user, generally a user's hands approaching the faucet 12. The aerator module 312 is provided with a bore 32 to permit the passage of water there through and standard faucet threads 34 to permit attachment of the aerator module 312 to the outflow end of faucet. The temperature sensor 26 extends into the bore 32 to obtain temperature data from the fluid flowing through the bore 32. The bypass button 24 may be implemented to enable a user to access hotter water than would otherwise be allowed to flow from the faucet. Essentially, in the event that a user wishes to access hotter water, pressing the by-pass button will prevent the controller 18/shut-off valve from closing in the event that the maximum temperature is exceeded during a particular user session. The controller/transmitter 28 receives and processes signals from the user detector 302 and temperature sensor 26 and transmits temperature data and/or an ON or OFF signal to the controller 18/shut-off valve 20.

Figure 5:
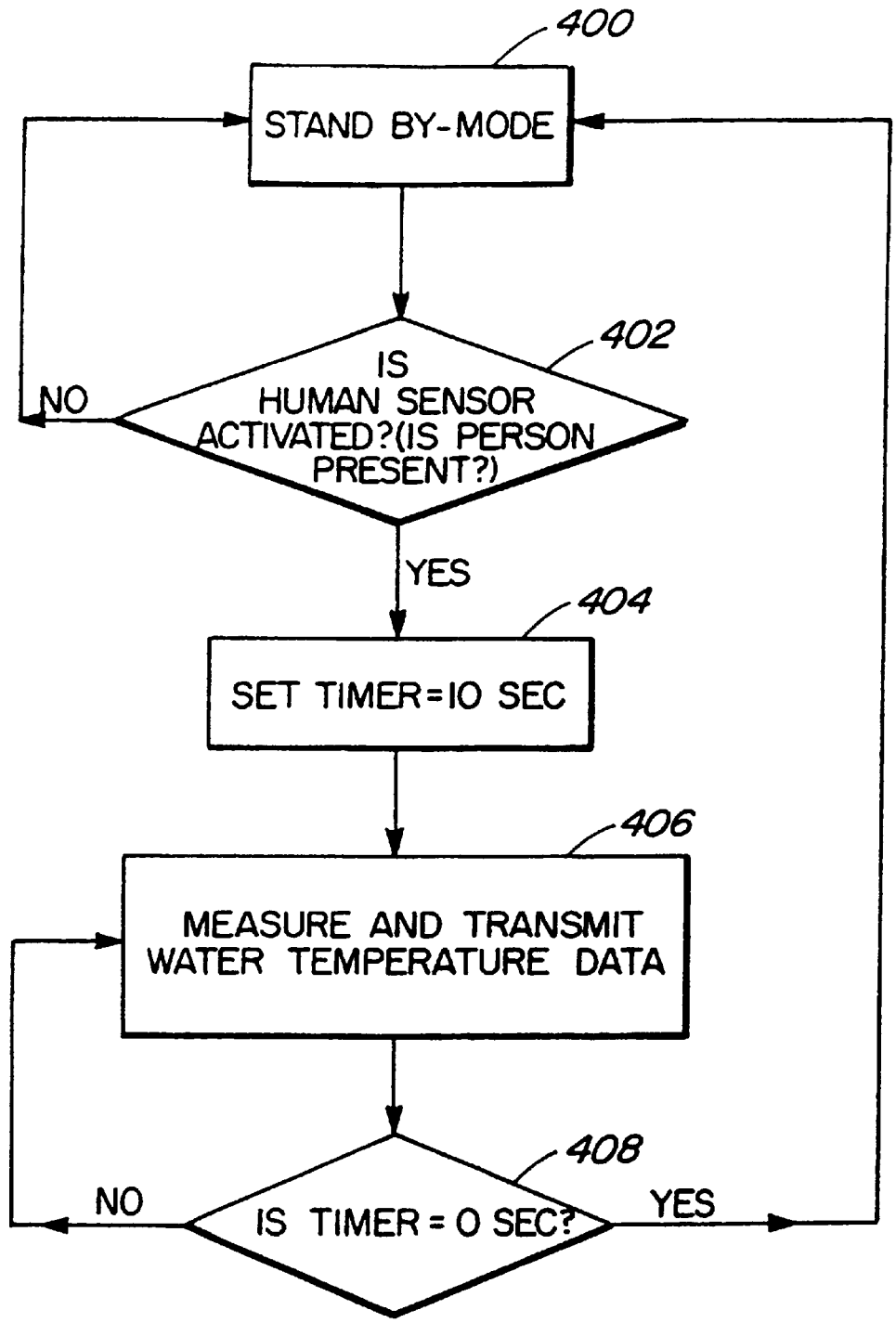
FIG. 5 is a flow chart showing a preferred control scheme for the operation of a hands-free spout attachment in accordance with the invention.

A flow chart of the operation of the hands-free, touchless, spout attachment (aerator module) 312 is shown in FIG. 5. When the faucet 12 is not in use, the temperature sensor/transmitter 16 circuit is in a stand-by mode (box 400) wherein no temperature data is generated or transmitted. During the standby mode (box 400) the power to the temperature sensor/transmitter circuit 16 is off.

Detection of a user by the user detector 302 (box 402) will start a 10 second timer (box 404). Power to the temperature sensor/transmitter 16 will be turned on in response to the detection of a user. Measurement of water temperature (box 406) is then performed and this data is transmitted to the controller 18.

At the expiry of the timer (box 408) the state of the temperature sensor/transmitter 16 circuit is sent back to standby mode 400 where the continued presence of a user will cause the timer to be reset and temperature data transmission to continue. If a user is no longer present the transmission of temperature data stops and the power to the temperature sensor/transmitter 16 is turned off, further enhancing battery life and ensuring that water flow is stopped in the absence of a user.

Figure 6:
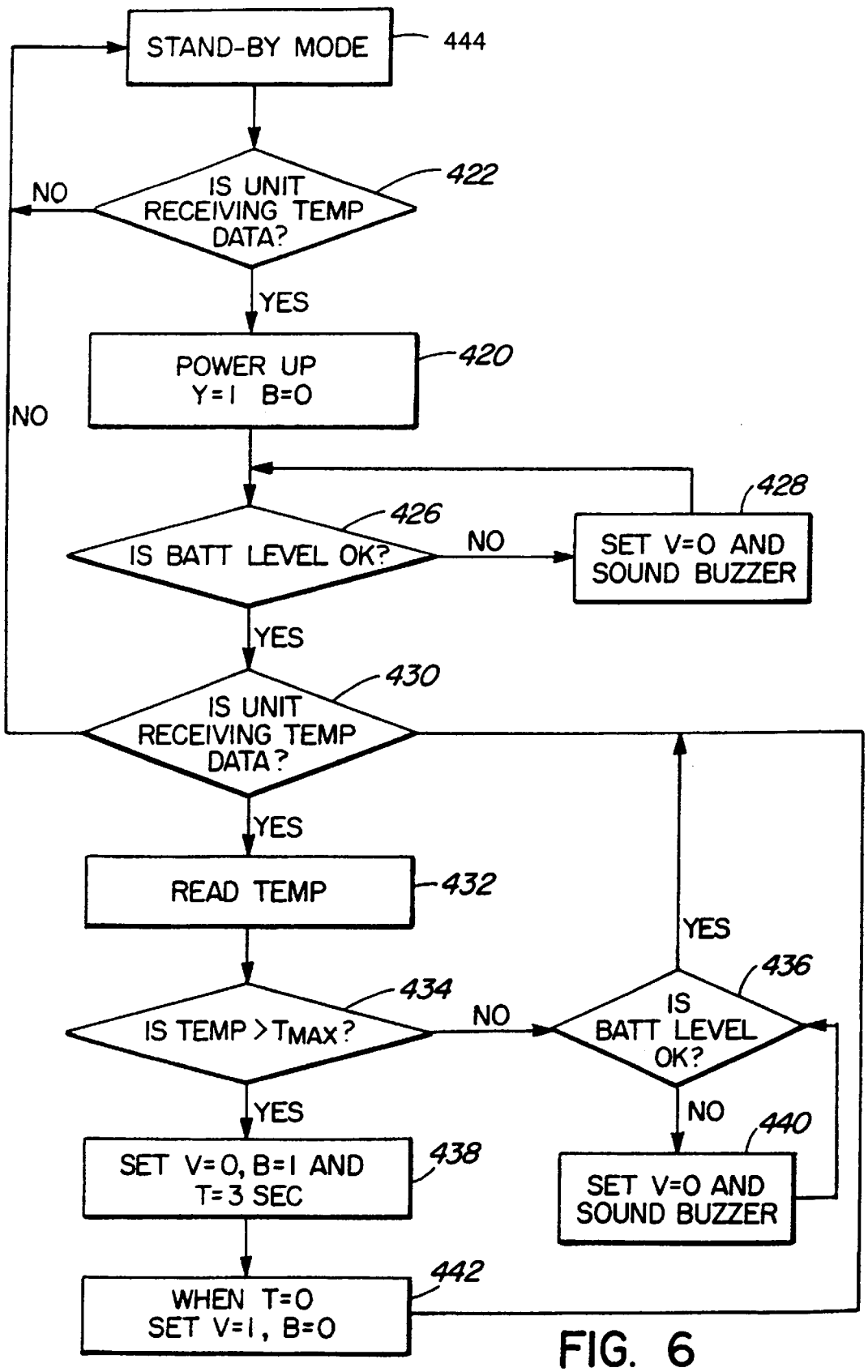
FIG. 6 is a flow chart showing a preferred control scheme for the operation of a valve unit when in the presence of a user detector in accordance with the invention.

A flow chart of the operation of the valve unit 18, 20 in the presence of a touchless aerator module 312 is shown in FIG. 6. The valve unit 18,20 has three binary variables, namely, safety mode, "S", valve, "V", and buzzer, "B". The power to the valve unit 18,20 will be turned on (box 420) from standby mode 444 when it starts to receive temperature data (box 422). This causes variable B to be set to 0 and V to be set to 1 (valve open). The battery level is checked (box 426) and if it is not OK, V is set to 0 (valve closed) and a low battery level indicator (i.e. a buzzer) is activated (box 428). If the battery level is OK, the unit checks to ensure temperature data is still being received (box 430). Continued receipt of temperature data causes the data to be read (box 432) and compared to a pre-set maximum allowable temperature (box 434). In the event that the water temperature is over the maximum, V is set to 0, B is set to 1 and a 3 second timer is started (box 438). When the timer reaches 0, V is set to 1 and B is set to 0 (box 442) and the unit checks to ensure temperature data is still being received 430 before reading the temperature again.

If the temperature is under the allowable maximum, the battery level is checked. In the case that the battery level is not OK, V is set to 0 and a low battery indicator is activated (box 440). If the battery level is OK the unit checks to ensure it is still receiving temperature data 430 before reading the temperature again.

In some circumstances it may be desirable to provide a base unit beside the faucet to display the water temperature, using for example an LCD, and/or sound an alarm. Preferably, the base unit and the controller 18/shut-off valve 20 will receive data independently.

Preferably, the valve unit is also provided with a rotary switch which allows the user to set the value of the shut-off temperature at discreet levels. It is also preferable that the valve is a solenoid valve.

Similarly, in order to facilitate installation in an environment where multiple units may be installed in close proximity to one another, the temperature sensor/transmitter 16 and valve unit 20 are preferably provided with a frequency selector in order to enable operation of adjacent units at distinct frequencies so as to minimize the risk of interference.

In certain installations, such as in residential care facilities, old age homes, day care facilities and schools, full time anti-scald protection may be desired. Accordingly, units may be built which do not allow for de-activation of the anti-scald device.

While the above described embodiments contemplate a radio frequency link between the sensor/transmitter 16, controller 18 and valve unit 20, other wireless links such as an LED, infrared or sound links may be utilized.

The system may also contemplates an embodiment in which an ON signal is generated by the user detector in the presence of a user and an OFF signal is generated by the user detector in the absence of a user and these signals are transmitted to a controller/valve system to initiate or interrupt the flow of fluid from the faucet, respectively. Accordingly, this embodiment does not provide anti-scald protection but merely automates the flow of water from a faucet wherein a wireless link is used between a user detector/transmitter and controller/valve system.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

I claim:

1. A faucet control system to monitor the temperature of a fluid flowing from a faucet and to control the flow of a fluid through the faucet comprising:
   a temperature sensor and transmitter for attachment to the faucet, the temperature sensor and transmitter for obtaining temperature data relating to the temperature of a fluid flowing from the faucet and for wireless transmission of the temperature data;
   a user detector operatively connected to the temperature sensor and transmitter, said user detector including means for activating the temperature sensor and transmitter in the presence of a user; and
   a controller for receiving and processing the temperature data wherein the controller includes means for initiating fluid flow from the faucet and/or means for interrupting fluid flow from the faucet if the temperature of the fluid flowing from the faucet exceeds a pre-set value or the user detector no longer detects the presence of a user.

2. A faucet control system as in claim 1 wherein the means for interrupting fluid flow from the faucet is a solenoid valve.

3. A faucet control system as in claim 2 wherein the means for interrupting fluid flow includes a solenoid valve responsive to a shut-off signal from the controller.

4. A faucet control system as in claim 3 wherein the solenoid valve is battery operated.

5. A faucet control system as in claim 1 wherein the controller is battery operated and includes means for detecting and indicating battery status.

6. A faucet control system as in claim 1 wherein the controller further comprises temperature display means for displaying the fluid temperature.

7. A faucet control system as in claim 6 wherein the temperature display means is an LCD display.

8. A faucet control system as in claims 1 wherein the temperature sensor and transmitter is battery operated.

9. A faucet control system as in claim 1 wherein the temperature sensor and transmitter include standard faucet threads for attachment of the temperature sensor and transmitter to the faucet.

10. A faucet control system as in claim 1 wherein the temperature sensor and transmitter communicates with the controller via a communication link selected from any one of a radio frequency, light-emitting diode or infrared communication link.

11. The faucet control system according to claim 10, wherein the temperature sensor and transmitter is battery operated.

12. The faucet control system according to claim 10, wherein the temperature sensor and transmitter includes means for detecting and indicating battery status.

13. A faucet control system to monitor the temperature of a fluid flowing from a faucet, said system comprising:
   a temperature sensor and transmitter adapted for attachment to the faucet, the temperature sensor and transmitter for obtaining temperature data relating to the temperature of a fluid flowing from the faucet and for non-continuous wireless transmission of the temperature data;
   a user detector operatively connected to the temperature sensor and transmitter, said user detector including means for activating the temperature sensor and transmitter in the presence of a user; and
   a controller operatively connected to a valve unit, the controller for receiving and processing the temperature data, the controller including means for interrupting fluid flow through the valve unit, if the temperature of the fluid flowing from the faucet exceeds a pre-set value or the user detector no longer detects the presence of a user.

14. A faucet control system to control the flow of a fluid through a faucet comprising:
   a user detector for detecting the presence of a user at the faucet and generating an ON signal in the presence of a user and an OFF signal in the absence of a user;
   a transmitter operatively connected to the user detector for attachment to the faucet, the transmitter for wireless transmission of the ON signal and OFF signal;
   a controller for receiving and processing the ON signal and OFF signal wherein the controller includes means for initiating fluid flow from the faucet upon receipt of the ON signal and means for interrupting fluid flow from the faucet upon receipt of the OFF signal.

15. A faucet control system as in claim 14 further comprising a temperature sensor operatively connected to the user detector and transmitter, the temperature sensor for obtaining temperature data relating to the temperature of a fluid flowing from the faucet wherein the temperature sensor and transmitter are activated upon receipt of an ON signal from the user detector and deactivated upon receipt of an OFF signal from the user detector and wherein the transmitter is adapted for wireless transmission of the temperature data and the controller is adapted for receiving and processing the temperature data and for initiating fluid flow from the faucet upon receipt of temperature data and for interrupting fluid flow from the faucet if the temperature of the fluid flowing from the faucet exceeds a pre-set value or the user detector no longer detects the presence of a user.

16. A faucet control system comprising:
   a transmission module, the transmission module including:
      a user detector for attachment to a faucet for detecting the presence or absence of a user; and,
      a transmitter operatively connected to the user detector for wireless transmission of data from the transmission module;
   a valve module, the valve module including:
      a controller for receiving and processing data received from the transmission module; and,
      a shut-off valve operatively connected to the controller for initiating or interrupting the flow of a fluid through the shut-off valve.

17. A faucet control system as in claim 16 wherein the transmission module further comprises a temperature sensor operatively connected to the user detector and the transmitter, the temperature sensor responsive to an ON signal from the user detector to initiate the collection of data relating to the temperature of a fluid flowing through the faucet and for providing the temperature data to the transmitter for wireless transmission and wherein the controller further includes means for initiating fluid flow through the shut-off valve if temperature data is being received and interrupting fluid flow through the shut-off valve if the temperature of the fluid flowing through the shut-off valve exceeds a pre-set value or temperature data is no longer being received.

* * * * *